2,868,807

PROCESS FOR THE PURIFICATION OF ALKYLENE OXIDES

Andrew A. Holzschuh, Midland, Mich., assignor to The Dow Chemical Company, Midland, Mich., a corporation of Delaware No Drawing. Application November 12, 1957
Serial No. 695,513

5 Claims. (Cl. 260—348)

This invention relates to a process for the purification of alkylene oxides, such as ethylene and propylene oxides. More particularly it relates to a process for removing certain chlorine-containing impurities from alkylene oxides.

One method for preparing alkylene oxides involves the dehydrohalogenation of the corresponding chlorohydrin by means of lime. As thus prepared, the alkylene oxide product contains a chlorinated product as an impurity. The impurity is thought to be vinylidene chloride or a similar compound, depending upon the feed stock employed in making the alkylene oxide. Chlorine-containing impurities of this nature create disadvantages when the oxide is used in the preparation of polyglycols and other products. Prior attempts to remove such impurities have included fractional and azeotropic distillation, adsorption on charcoal and other adsorbents, and polymerization of the impurities. None of the heretofore attempted techniques has been particularly successful for purposes of removing the mentioned chlorine-containing impurities. It is imperative that the indicated type of impurities be removed from alkylene oxides if the oxides are to achieve their ultimate potential as intermediates for the preparation of other products.

Accordingly it is the principal object of this invention to provide a process for removing the stated chlorine-containing impurities from alkylene oxides, particularly from ethylene and propylene oxides their homologous oxides that contain up to about 8 carbon atoms.

The above and related objects are realized by a process which involves treating, at a subzero temperature, the crude propylene or other alkylene oxide which contains chlorinated olefin impurity with an excess of ozone, based on the quantity of the impurity in the alkylene oxide product. The subzero treatment with ozone is followed by distillation to recover the purified alkylene oxide product.

A common procedure for preparing propylene oxide is to react propylene with hypochlorous acid to form propylene chlorohydrin, followed by treatment with lime to form propylene oxide. The other lower alkylene oxides may be prepared similarly by substituting the appropriate olefin for the propylene oxide. When prepared by this procedure, however, the alkylene oxide product unavoidably contains a chlorinated impurity. The impurity may be present in amount of 0.25 by weight or higher, analyzed as chlorine. Thus, if the impurity is 50 percent chlorine, the actual impurity itself may be present in the alkylene oxide product in a concentration of 0.5 percent by weight or higher. Such concentrations of impurities cannot be tolerated when the alkylene oxide is to be employed as an intermediate in subsequent reactions. Crude alkylene oxide products of the described nature are most advantageously treated for purification in accordance with the present invention.

In order to accomplish the present treatment, the crude alkylene oxide product is chilled to a subzero temperature and maintained thereat throughout its exposure to the ozone. The most desirable subzero temperature for treatment is about minus 20° C. When temperatures that are appreciably above or below the indicated temperature are employed, longer exposure times, or excessive use of ozone, or both, may be necessitated. If desired, however, temperatures up to about 0° C. may be employed in the treatment in order to significantly reduce the concentration of undesired chlorine-containing impurities in the product. Likewise temperatures down to about minus 30° C. may be used although below minus 20° C. the efficiency of the reaction is reduced.

Means for preparing ozone are well known in the art. The conventional ozonizers usually prepare ozone from oxygen by silent electrical discharge, wherein gaseous oxygen is passed through a zone of extremely high potential. By such a procedure, there is generated a few percent by volume of ozone in the gaseous oxygen. This dilute gaseous solution is applicable for use in the present process.

In operation, the ozone or ozone-containing stream is bubbled through the chilled liquefied alkylene oxide product to be purified. It is believed that the ozone reacts with the unsaturated impurity to form an ozonide. Such intermediate is readily ruptured at a carbon-carbon bond to give two molecules of aldehydes. The aldehydes, being highly volatile, are easily removed from the alkylene oxide by simple distillation.

The amount of ozone to be used in practice of the present invention will vary with the concentration of the chlorine-containing impurity in the crude alkylene oxide product. In all cases, the ozone must be used in molar excess of the impurity concentration. As a general rule, it is beneficial for the quantity of ozone used to be at least in molar proportion to the chlorine-containing impurity being removed. The invention is not to be limited to use of such quantities as a minimum, however, since amounts of ozone down to a slight excess of 0.1 percent or less over the concentration of impurity may be satisfactorily used in order to reduce the concentration of impurity to a level where the alkylene oxide may be used without further purification. When quantities of ozone are employed that are much greater than the quantity of impurity being removed, there is ordinarily no further proportional increase in removal of impurities. As a consequence, such excesses are merely wasteful of ozone.

By way of illustrative example, two samples of 300 cubic centimeters of a crude propylene oxide containing vinylidene chloride as an impurity in a concentration of 0.24 percent by weight of the crude propylene oxide, analyzed as chlorine, were placed in a gas washing bottle with a glass frit and chilled to minus 20° C. An oxygen stream containing about 2 percent by volume ozone was bubbled through each sample of the crude propylene oxide at the rate of about 5 milligrams ozone per minute. The ozone was bubbled through one sample of the oxide for one hour and through the other sample for 2 hours. The treated material was then fractionated through a 12 Vigreux column at a reflux ratio of 4 to 1. The center fraction of distillate, constituting the major portion, was analyzed for chlorine. Each sample was found to contain 0.03 percent chlorine.

When the process was repeated excepting to use air in place of ozone, the chlorine content of the center fraction was found to be 0.26 percent by weight.

I claim:

1. A process for removing chlorine-containing unsaturated impurities from crude lower alkylene oxides containing up to 8 carbon atoms comprising, as essential sequential steps (1) cooling the impurity-containing alkylene oxide to a temperature beneath about 0° C., (2) contacting the chilled alkylene oxide with a molar excess of ozone while said crude alkylene oxide is being maintained at a temperature of not over 0° C., (3) distilling the ozone treated product of step (1) to recover the purified alkylene oxide product.

2. The process claimed in claim 1, wherein said ozone is contacted with said crude alkylene oxide by bubbling a gaseous ozone-containing stream through said crude alkylene oxide.

3. The process claimed in claim 1, wherein said ozone is employed in an amount which is at least molar equivalent to that of said impurity.

4. The process claimed in claim 1, wherein said alkylene oxide is chilled to a temperature of about minus 20° C.

5. The process claimed in claim 1, wherein said alkylene oxide is propylene oxide and said chlorinated unsaturated impurity is vinylidene chloride.

References Cited in the file of this patent

UNITED STATES PATENTS

| | | |
|---|---|---|
| 2,550,847 | Mitchell et al. | May 1, 1951 |
| 2,615,901 | McClellan | Oct. 28, 1952 |
| 2,622,060 | Robeson et al. | Dec. 16, 1952 |
| 2,697,104 | Lowe et al. | Dec. 14, 1954 |
| 2,756,241 | Courter | July 24, 1956 |
| 2,771,473 | Courter | Nov. 20, 1956 |
| 2,775,600 | Maslan | Dec. 25, 1956 |